Aug. 10, 1965
M. K. WITT
3,200,398
THREE DIMENSIONAL INDICATOR
Filed Dec. 16, 1948
2 Sheets-Sheet 1
*Fig.1A.*
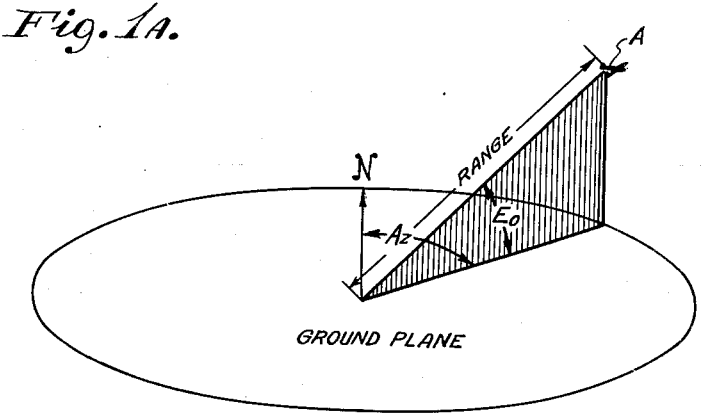
*Fig.1B.*
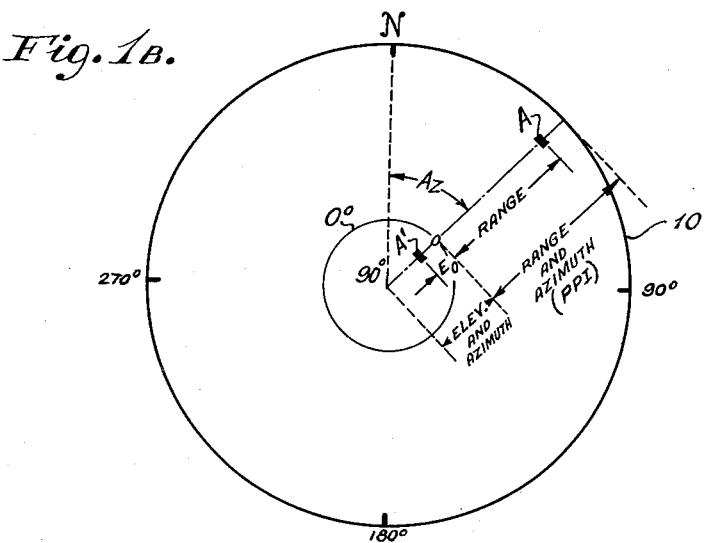
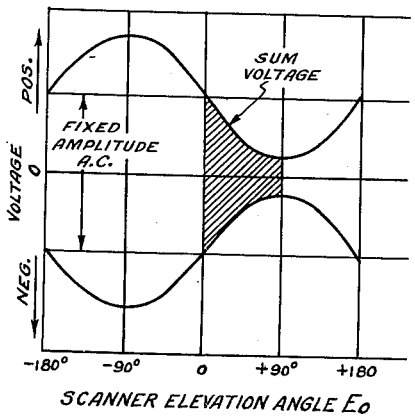
*Fig.3.*
INVENTOR
MARCUS K. WITT
BY
Paul R. Hunter.
ATTORNEY

United States Patent Office 3,200,398
Patented Aug. 10, 1965

3,200,398
THREE DIMENSIONAL INDICATOR
Marcus K. Witt, Austin, Tex., assignor to Sperry Rand
Corporation, a corporation of Delaware
Filed Dec. 16, 1948, Ser. No. 65,557
7 Claims. (Cl. 343—11)

This invention relates to three dimensional data presentation systems and more particularly to a three dimensional indicator for radar.

In a radar system it is generally desirable to provide the range, azimuth and elevation of one or more targets. Modern radars collect a great mass of this information from a plurality of targets almost instantly. One of the most important limitations on the use of this great mass of information, is the speed with which it can be assimilated and intelligently used by the human operators. The speed of interpreting the information is so much slower than the speed of collecting it, that any aid given to the operator in the presentation of this data will be a great improvement.

A basic problem in the presentation of three dimensional data is the difficulty in presenting it on a two dimensional indicator such as a cathode ray tube screen. Thus far, it has generally been necessary to supply the three dimensional data to at least two indicators, thus forcing the operator to periodically move his eyes, refocus on different pictures, and perform mental associations between the separate two dimensional representation. The present invention minimizes this difficulty, and provides the three dimensional data on a single cathode ray tube screen, in a manner which may be easily interpreted by the operator.

Accordingly, a principal object of the invention is to provide improved means of presenting three dimensional data.

Another object of the invention is to provide three dimensional data on a single two dimensional indicator.

Another object of the invention is to provide azimuth, range, and elevation information on the face of a single cathode ray tube indicator.

Another object of the invention is to provide two dimensional representations on a single cathode ray tube related in such a manner as to be easily interpreted.

Another object of the invention is to provide at least two concentric PPI type presentations on a single cathode ray tube.

Another object of the invention is to provide an open center PPI presentation wherein the open center on the indicator face may be utilized for other related information.

Another object of the invention is to provide three dimensional radar target data and related identification information on a single cathode ray tube screen.

These and other objects of the invention will become apparent from the following description and illustrations of which FIG. 1A is a cathode ray tube representation of the concentric PPI type of the invention, and FIG. 1B is a related illustrative diagram;

FIGS. 3 and 4 are wave forms explanatory of the invention.

Since it is not practical to indicate more than two dimensions in one indication on a flat surface, the present invention utilizes a pair of integrated two-dimensional indications on a single indicator. In order for the operator to quickly use these indications they are placed physically as close together as possible and each indication has one common dimension in order to correlate them.

Apparatus arranged and connected in accordance with the present invention may include a two electron gun type of cathode ray tube, such as the commercial type 5SP7, to provide the two indications, and by making both indications circular and concentric the space available is most efficiently used.

Referring to FIG. 1A there is shown a three dimensional representation illustrating a target A and the desired information concerning that target, namely the azimuth angle Az, elevation angle $E_0$ and the range.

FIG. 1B shows how this three dimensional data is presented on a single cathode ray tube. The presentation is basically a conventional PPI (Plan Position Indicator) showing range and azimuth in polar coordinates. However, the PPI has an open center and this open center is utilized to provide the elevation angle $E_0$ information.

The open center portion of the indication is also in polar coordinates, the azimuth being aligned with the azimuth of the PPI portion, and the elevation angle $E_0$ being substituted for the range. The elevation angle $E_0$ is represented as follows: The tube center represents the zenith, that is, 90° elevation angle, and the $E_0$ indication proceeds radially outward as the elevation angle decreases, so that 0°$E_0$ is the outer periphery of the central portion.

For instance, in FIG. 1 the target A has an elevation angle $E_0$ of approximately 30°. Therefore, the elevation angle $E_0$ is represented at A′ which is one-third of the distance between 0°$E_0$ at the outer periphery of the central portion and 90° at the center of the tube screen. The center portion may be 1 inch in diameter on a 5 inch diameter cathode ray tube. Thus, it is seen that the desired three dimensions are represented physically close together and related by a common dimension, namely azimuth angle, so that they may be easily interpreted.

Figure 2:
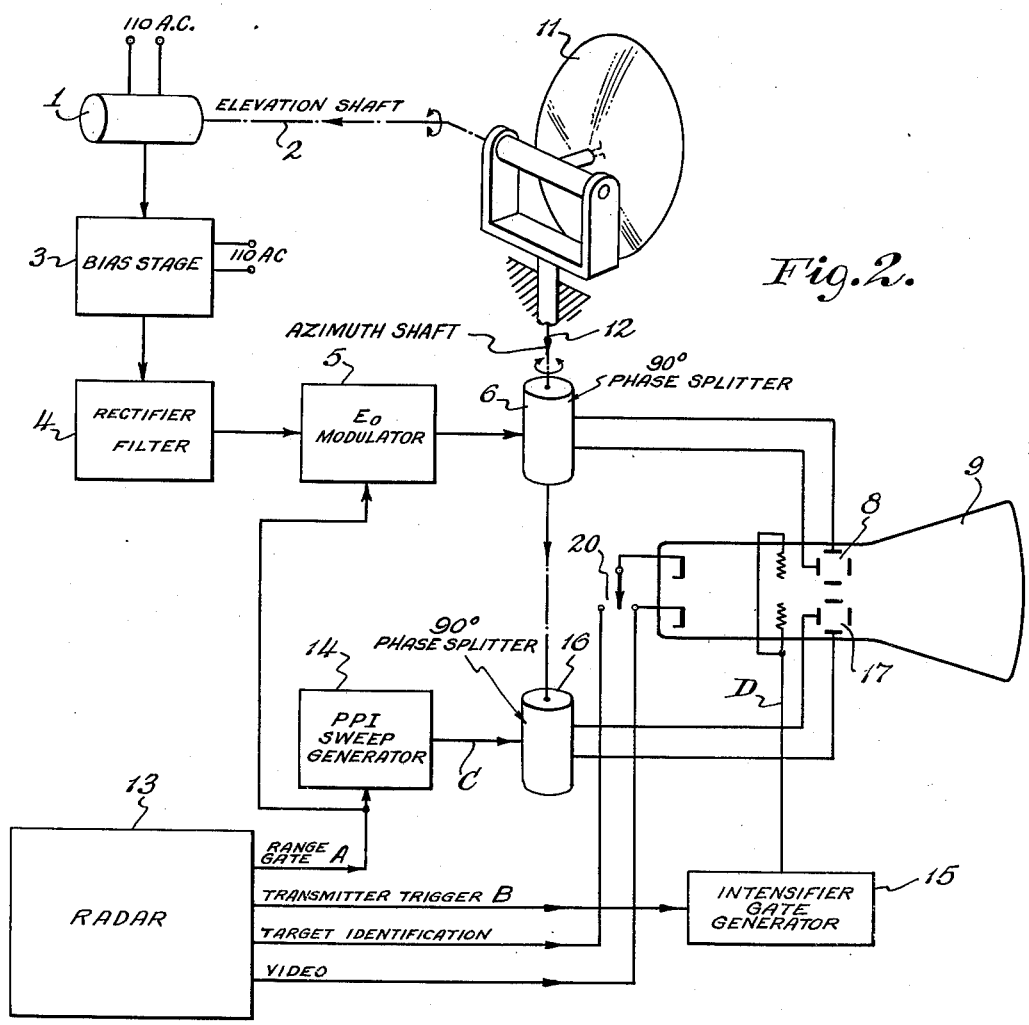
FIG. 2 is a block diagram of an embodiment of the invention.

Referring to FIG. 2, the elevation angle signal for the $E_0$ portion of the double gun tube indicator 9 is obtained from a synchro unit 1 of a conventional type, excited by a 60-cycle source, whose shaft 2 is mechanically connected to the elevation shaft of the scanner 11. The signal from synchro 1 (S1 and S3 from the stator windings) is preferably amplified and a fixed amplitude 60-cycle voltage bias is added to it in the bias stage 3. The A.C. voltages may be combined in a double input-single output transformer.

At the output of bias stage 3 we thus have a combined A.C. voltage composed of the output of the synchro unit 1, varying sinusoidally with elevation angle, 90° being ¼ turn on the synchro 1, plus a fixed A.C. voltage as illustrated in FIG. 3. By orienting the synchro 1 so that the output of the sum voltage is a minimum when the scanner 11 is at 90° elevation, the sum of the fixed voltage and the synchro voltage will be as shown in FIG. 3. It is noted that as the scanner 11 rotates from 90° elevation to 0° which is here chosen at its lower limit, the sum A.C. voltage is increasing.

This sum voltage output is then applied to conventional rectifier-filter 4, which provides a D.C. voltage which is a function of scanner elevation angle $E_0$. This D.C. voltage is then modulated in $E_0$ modulator 5 by a rectangular wave of the repetition rate frequency thereby providing a rectangular wave whose amplitude is proportional to the D.C. voltage of the rectifier filter 4.

The output of modulator 5 is applied to the stator of a quadrature type synchro unit 6 which operates as a 90° phase splitter, whose shaft 12 is rotated by the azimuth motion of the scanner 11. The output of phase splitter synchro 6 comprises two rectangular waves which are the quadrature components of azimuth motion. These two voltages may be filtered and amplified, if desirable, by conventional circuits, which are here omitted, and are then applied to the $E_0$ deflection plates 8 of the indicator 9.

Therefore, the $E_0$ deflection plates 8 are provided with voltages in quadrature representing the azimuth motion of the scanner 11. These quadrature voltages are amplitude modulated by elevation motion so that the length of the radius of the indication is a function of the elevation angle $E_0$. The angle of this radius, in a horizontal plane, with respect to the north reference radius is the azimuth angle. Video signals from the radar unit 13 are applied to the cathode of indicator 9. Therefore, targets will appear in the central portion of the indicator 9 as illustrated in FIG. 1B having a radial deflection proportional to the elevation angle $E_0$.

Figure 4:
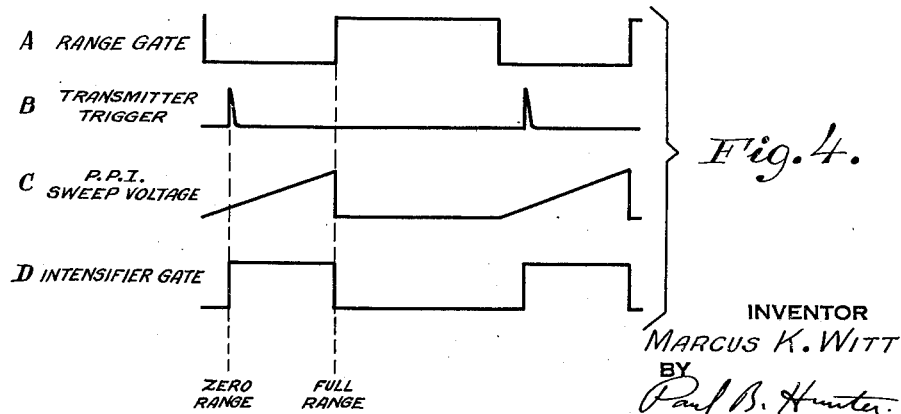

It may be desirable at this time, to refer to the voltages appearing at different points in the circuit of FIG. 2, which are illustrated in FIG. 4.

Wave form A of FIG. 4 is a control gate and is a rectangular voltage at the radar repetition rate frequency, the negative portion of which is somewhat greater than the desired range time.

Wave form B is the transmitter pulse trigger which is arranged to be delayed slightly from the beginning of the negative portion of range gate A as illustrated.

Wave form C is the PPI sweep voltage output of sweep generator 14.

Wave form D is a rectangular voltage which is triggered on by transmitter trigger B. It is generated by generator 15 and used as an intensifier gate being applied to both grids of indicator 9, thereby to permit video signals to pass during the desired interval.

The operation of the PPI circuits may be explained with reference to the above wave forms. The range gate A is applied to conventional sawtooth PPI sweep generator 14 which generates a sweep voltage as illustrated in wave form C. This sweep voltage is then applied to a conventional 90° phase splitter synchro 16, whose shaft is connected to the azimuth shaft 12 of scanner 11 and operates in the same manner as phase splitter synchro 6. Its output is applied to the PPI deflection plates 17 of the indicator 9 providing a PPI type presentation in a conventional manner with the exception that it has an open center due to the blanking action of intensifier gate D. The grids of indicator 9 are normally cut-off except during the positive portion of gate D. As previously mentioned, the deflection of the indications of the central portion is completely independent of sweep voltage C. Therefore, the zero range point occurs at the time of the transmitter trigger as illustrated in FIG. 4. The video signals from radar 13 are also applied to the cathode of the PPI electron gun of indicator 9.

Other variants of the invention may be made without departing from the scope thereof. For instance, IFF identification signals or other related information from radar 13 may be conveniently applied to the central portion of the indicator screen by means of switch 20. These signals would then be conveniently related to the targets appearing on the PPI portion of the screen due to the relation of the azimuth deflection voltages.

Magnetic deflection coils may be substituted for one or of the deflection plates by making conventional modifications to the circuit.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radar data presentation system, a radar antenna, means to present azimuth, elevation, and range information on a two-dimensional indicator, comprising a cathode ray tube having two independent electron beams, means to apply open-center range-azimuth radial deflection voltages to at least one of said electron beams including a gate voltage generator to provide said open center, and means to apply elevation-azimuth radial deflection voltages to said other electron beam including synchro generator means connected to said radar antenna to correlate said two deflection voltages in azimuth beam whereby two related concentric presentations supplying at least three dimensions are obtained.

2. A double electron gun cathode ray tube indicator containing separate electron sources and deflection means, means to energize one of said deflection means with azimuth and range deflection voltages, means to energize the second of said deflection means with elevation angle and azimuth deflection voltages in polar coordinates, including means to obtain a voltage proportional to elevation, and synchro generator means connected to obtain the azimuth quadrature components of said elevation voltage, the elevation angle being represented as a radial deflection from the indicator center, and gate generator means connected to said indicator and adapted to arrange said two deflections concentrically on said indicator.

3. A double electron gun cathode ray tube indicator, each electron gun containing an electron source being associated with separate deflection means, first generator means to energize one of said deflection means with radial deflection voltages, second generator means to energize the second of said deflection means with radial azimuth deflection voltages, the elevation angle being represented as the magnitude of radial deflection, said second generator means comprising a synchro connected to the elevation shaft whose angle is desired to be represented, means connected to said synchro to obtain a voltage proportional to said elevational angle, means to modulate said elevation voltage with an alternating voltage, means to obtain quadrature azimuth components of said modulated elevation voltage, comprising a synchro electrically connected to said modulator and mechanically connected to the azimuth shaft of said scanner, and two pairs of said cathode ray tube deflection plates connected to the output of said quadrature synchro.

4. A double electron gun radar indicator, means to radially deflect one of said electron guns with deflection voltages representing elevation angle and azimuth, comprising means to obtain a voltage proportional in amplitude to said elevation, a synchro connected to obtain the azimuth quadrature components of said voltage, means applying said quadrature components to said deflection plates, and means to deflect the other electron gun with radial deflection voltages representing azimuth and range, and means connected to control said deflecting voltages and arranged to provide two concentric type indications, said last means including modulating means and gate generator means.

5. In a data presentation system, a double electron gun cathode ray tube indicator comprising azimuth-range open-center plan position presentation means including radial sweep voltage generating means connected to one of said electron guns including gate voltage means to blank out the center portion of said presentation, azimuth-elevation angle indication means arranged to utilize said open center of said cathode ray presentation comprising alternating currrent generating means, and modulator means connected to and adapted to modulate said alternating current generator means proportionally to elevation.

6. In a data presentation system, means to present azimuth, elevation, and range information on a two dimensional indicator comprising a double electron gun cathode ray tube, means to apply polar coordinate deflection voltages to one electron gun of said cathode ray tube to show azimuth and range, gate circuit means connected to blank the center portion of said indicator, means to apply modulated deflection voltages proportional to antenna elevation to said other electron gun to energize said center portion of said cathode ray tube screen, and means to rotate said elevation deflection voltages in synchronism with said polar coordinate azimuth deflection voltages.

7. In a radar system including a directional scanner, an indicator comprising a cathode ray tube, means to radially deflect the electron beam of said cathode ray tube from its center, means to synchronously orient said radial deflection in response to the azimuthal position of said scanner, means to intensify said electron beam at a distance from the center of said indicator dependent upon the elevational angle of said scanner, and means to intensify a further extended radial deflection of said electron beam at a distance dependent upon the range of a detected target.

References Cited by the Examiner

UNITED STATES PATENTS

| | | | |
|---|---|---|---|
| 2,295,412 | 9/42 | Little | 315—24.1 |
| 2,405,231 | 8/46 | Newhouse | 343—108 X |
| 2,409,448 | 10/46 | Rost | 343—10 |
| 2,427,219 | 9/47 | Luck | 343—11 |
| 2,427,220 | 9/47 | Luck | 343—11 |
| 2,433,002 | 12/47 | Norton et al. | 343—11 |
| 2,433,283 | 12/47 | Luck | 343—10 |
| 2,436,655 | 2/48 | Locke | 343—11 |
| 2,449,976 | 9/48 | Busingies | 343—11 |
| 2,463,529 | 3/49 | Ferrill | 343—108 X |
| 2,480,123 | 8/49 | Deloraine | 343—10 |
| 2,513,962 | 7/50 | Patterson | 343—11 |

OTHER REFERENCES

Journal of the Institute of Electrical Engineering, vol. 95, part III, No. 37. Pages 371–375. September 1948.

CHESTER L. JUSTUS, *Primary Examiner.*

MELVIN H. FRIEDMAN, SIMON YAFFEE, NORMAN H. EVANS, *Examiners.*